Sept. 11, 1934.  C. R. BUMBAUGH  1,973,680
WELDING BELL
Filed Dec. 8, 1933
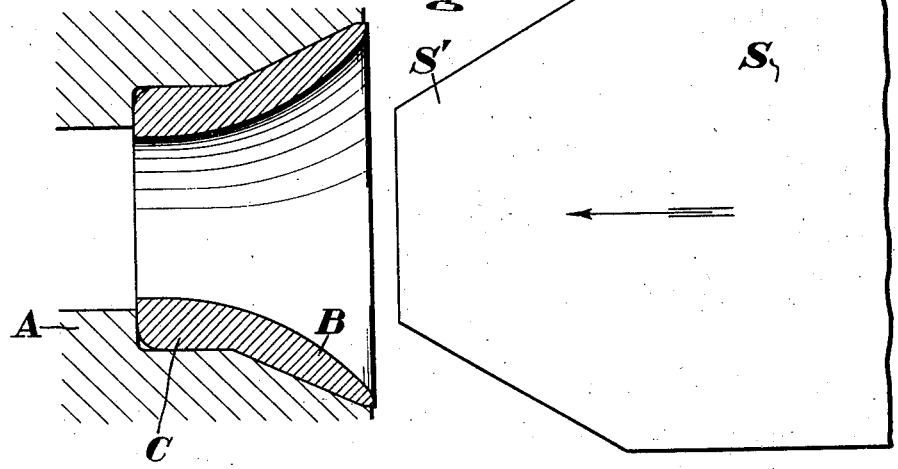
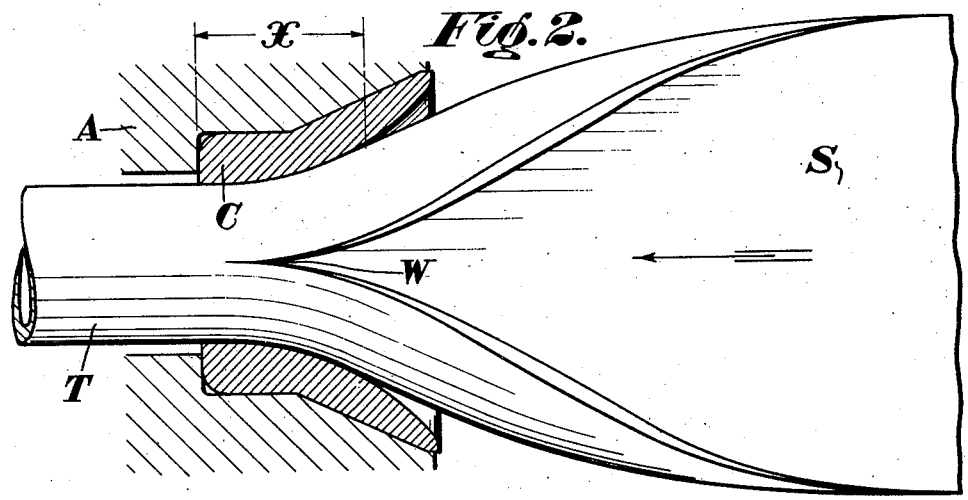
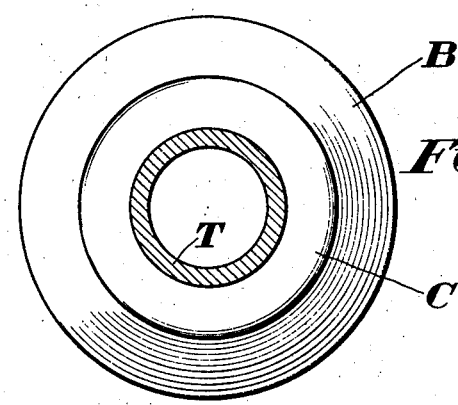
Inventor:
CHARLES R. BUMBAUGH,
by
his Attorneys.

Patented Sept. 11, 1934

1,973,680

UNITED STATES PATENT OFFICE

1,973,680
WELDING BELL

Charles R. Bumbaugh, Lorain, Ohio, assignor to National Tube Company, a corporation of New Jersey Application December 8, 1933, Serial No. 701,559

7 Claims. (Cl. 205—28)

This invention relates to welding bells, and more particularly to those used in the manufacture of butt-welded pipes and tubes.

In tube welding practice, welding bells are usually composed of cast iron and have a relatively short life of service. In addition, they must be frequently cleaned and often collect scale and impurities in such quantities as to cause longitudinal scratches in the surface of the material being processed. This is largely due to the hardness of the composition of the metal of the bell.

One object of the present invention is the provision of a novel alloy particularly adaptable for tube welding bells which will stand up extremely well in service, due to the fact that as they are worn they may be brought back to size by upsetting and refinishing, and used many times over again.

Another object is the provision of a novel alloy for tube welding bells which will be self-cleansing, as no scale or metal will adhere to the inner surface of the bell when the heated skelp is drawn therethrough, and accordingly serve to obviate the usual longitudinal scratching, etc.

These and further objects will be apparent after referring to the drawing, in which:

Figure 1 is a sectional plan of a conventionally shaped tube welding bell with the skelp about to enter the same.

Figure 2 is a view similar to Figure 1 but showing skelp in the process of being formed into a tube.

Figure 3 is an end view of the rearward portion of the welding bell and showing, in section, the completed tube emerging therefrom.

Referring more particularly to the drawing, the letter A designates a suitable support in which there is disposed a welding bell having an advance bell-shaped portion B and a rearward substantially cylindrical portion C.

In accordance with well known principles, strip skelp S is provided with a reduced extremity S' such as will permit its entry through the welding bell in such manner as to cause it to assume a cylindrical shape and, due to the inherent heat, force its edges to be welded together in abutting relationship, as at W. Due to the substantial contact of the skelp with the bell throughout the area indicated at X in Figure 2, various metal particles, impurities, and scale collect on this surface and scratch the surface of the formed tube T throughout its length.

According to the teaching of the present invention, the novel welding bell is composed entirely (i. e., both portions B and C), of an alloy having a high copper content. Experiment has proven that an alloy having the following ingredients will wear considerably better than a ratio of 16 to 1 with respect to the wearing qualities of the old type of cast iron bell:

|  | Per cent |
|---|---|
| Copper | 98.25 |
| Tin and/or zinc | 1.50 |
| Phosphorus | .25 |

The foregoing analysis includes, as the second ingredient, either tin and/or zinc in the proportion stated, for the reason that equally satisfactory results have been obtained by the use of either or a combination of both.

Numerous departures may be made, however, from the specific percentages mentioned, as it has been found that with copper almost as low as 50 per cent and tin and/or zinc and phosphorus adjusted proportionately, very satisfactory results have been obtained.

As perceptible wear appears on the alloyed bell of the invention, it may be brought back to size by upsetting and refinishing, and used again on the draw bench.

While I have described several specific embodiments of my invention, it will be understood that I do not wish to be limited exactly thereto, since various modifications may be made without departing from the scope of my invention, as defined in the following claims.

I claim:

1. A metallic welding bell having at least its working surface composed of a copper predominant alloy.

2. A metallic welding bell having at least its working surface composed of an alloy of copper and at least one other metal, the copper content being at least 50 per cent.

3. A metallic welding bell having at least its working surface composed of an alloy of copper and at least one other metal, the copper content being at least 90 per cent.

4. A metallic welding bell having at least its working surface composed of an alloy of at least 95 per cent copper, at least 1.25 per cent tin, and at least .15 per cent phosphorus.

5. A metallic welding bell having at least its working surface composed of an alloy of at least 95 per cent copper, at least 1.25 per cent zinc, and at least .15 per cent phosphorus.

6. A metallic welding bell having at least its working surface composed of 98.25 per cent copper, 1.50 per cent tin and .25 per cent phosphorus.

7. A metallic welding bell having at least its working surface composed of 98.25 per cent copper, 1.50 per cent zinc and .25 per cent phosphorus.

CHARLES R. BUMBAUGH.